(12) United States Patent
Hublart et al.

(10) Patent No.: US 7,712,574 B2
(45) Date of Patent: May 11, 2010

(54) VEHICLE STEERING SYSTEMS

(75) Inventors: Bernard Hublart, Beauvais (FR);
Cedric Deman, Savignies (FR);
Malcolm Shute, St. Germain la Poterie (FR); Vince Chauvel, St. Gilles (FR)

(73) Assignee: AGCO SA, Beauvais (FR)

( * ) Notice: Subject to any disclaimer, the term of this patent is extended or adjusted under 35 U.S.C. 154(b) by 184 days.

(21) Appl. No.: 11/847,940

(22) Filed: Aug. 30, 2007

(65) Prior Publication Data

US 2008/0053742 A1   Mar. 6, 2008

(30) Foreign Application Priority Data

Aug. 30, 2006   (GB) .................................. 0617049.2

(51) Int. Cl.
*B62D 5/06* (2006.01)
(52) U.S. Cl. ....................................... 180/441; 180/443
(58) Field of Classification Search .................. 180/441, 180/442, 421, 417, 422, 443
See application file for complete search history.

(56) References Cited

U.S. PATENT DOCUMENTS

| | | | | |
|---|---|---|---|---|
| 3,750,405 | A | * | 8/1973 | Lech et al. ..................... 60/422 |
| 4,457,132 | A | * | 7/1984 | Roberts ........................ 60/384 |
| 4,936,402 | A | | 6/1990 | White, Jr. |
| 5,249,503 | A | | 10/1993 | Phillips |
| 6,213,246 | B1 | * | 4/2001 | Bohner et al. ................ 180/403 |
| 6,240,351 | B1 | * | 5/2001 | Hou et al. ....................... 701/41 |
| 6,321,535 | B2 | * | 11/2001 | Ikari et al. ..................... 60/421 |
| 6,345,674 | B1 | * | 2/2002 | Easton ....................... 180/6.44 |
| 7,040,445 | B2 | * | 5/2006 | Ishii et al. .................... 180/307 |
| 7,392,867 | B2 | * | 7/2008 | Akashima et al. ........... 180/6.38 |
| 2001/0032461 | A1 | * | 10/2001 | Biggi et al. .................... 60/384 |
| 2003/0201134 | A1 | * | 10/2003 | Ishii et al. .................... 180/307 |
| 2006/0048977 | A1 | * | 3/2006 | Akashima et al. ............ 180/6.6 |
| 2007/0105683 | A1 | * | 5/2007 | Irikura et al. ................ 475/230 |

FOREIGN PATENT DOCUMENTS

| | | |
|---|---|---|
| GB | 1437907 | 6/1976 |
| JP | 02060885 | 3/1990 |

OTHER PUBLICATIONS

Search Report for Application No. GB0617049.2 dated Nov. 22, 2006.

* cited by examiner

*Primary Examiner*—Paul N Dickson
*Assistant Examiner*—Tashiana Adams

(57) ABSTRACT

A vehicle system has a steering circuit which includes a steering actuator supplied with pressurize fluid from a pressure source to turn an associated vehicle wheel to the left or right in response to the movement of the steering wheel. A feedback circuit is provided which includes a steering motor connected with the steering wheel and supplied with pressurized fluid via an electronically controlled feedback control valve means in response to signals received from a control unit to generate a steering feedback force acting on the steering wheel.

9 Claims, 2 Drawing Sheets

# VEHICLE STEERING SYSTEMS

BENEFIT CLAIM

Figure 1:
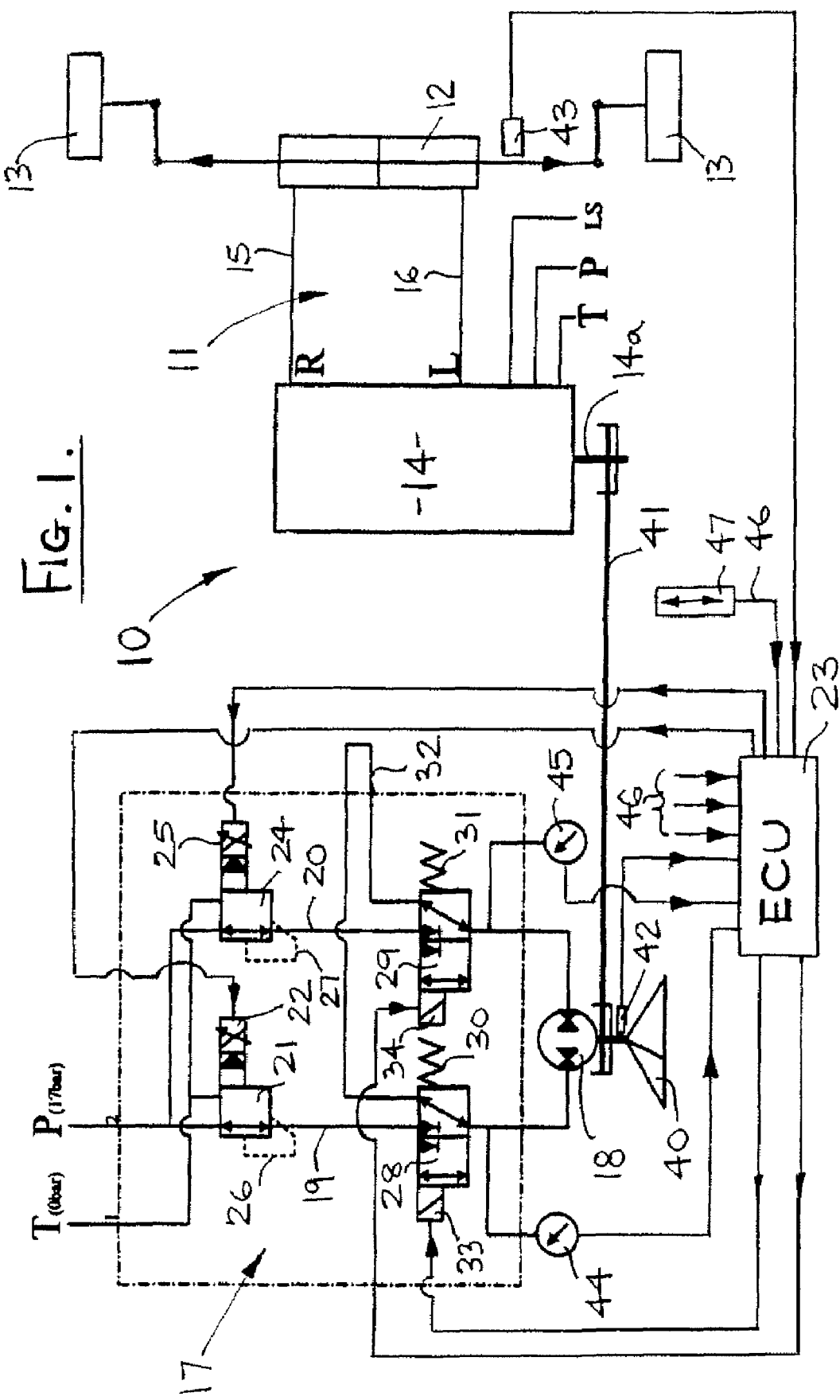

This application is based on, and claims the benefit of priority to, UK application GB 0617049.2, filed 30 Aug. 2006, which priority application is hereby incorporated by reference.

BACKGROUND OF THE INVENTION

1. Field of the Invention

This invention relates to vehicle steering systems and in particular to such systems which are suitable for us on a tractor or similar utility vehicle.

2. Description of Related Art

It is well known in such vehicles to steer the vehicle using a hydraulically operated steering actuator which is supplied with pressurized fluid from a pressurized source to provide power assisted steering. One of the problems of such systems is that the system provides relatively little steering feedback to the driver and this is particularly disadvantageous when the vehicle is being driven on roads at higher speeds.

It is an object of the present invention to provided an improved vehicle steering system which is suitable for use on tractors or other similar utility vehicles.

BRIEF SUMMARY OF THE INVENTION

Thus according to the present invention there is provided a vehicle steering system comprising a steering circuit which includes a steering actuator supplied with pressurized fluid from a pressure source to turn an associated vehicle wheel to the left or right in response to the movement of the a steering wheel, and a feedback circuit which includes a steering motor connected with the steering wheel and supplied with pressurized fluid via an electronically controlled feedback control valve means in response to signals received from a control unit to generate a steering feedback force acting on the steering wheel.

Typically the pressurized fluid is supplied to the steering actuator by a power steering unit such as the Oribitrol (registered trade mark) unit sold by Danfoss.

The electrically controlled feedback control valve means may be a proportional pressure control valve means which regulate the pressure supplied to the motor, and hence the level of steering feedback, depending on the level of feedback signal received from the control unit.

The pressure from the electrically controlled feedback control valve means is preferably passed to the steering motor via a switching valve means which is held in an open position, in which the proportional pressure is supplied to the hydraulic motor, by an electrical signal received from the control unit and is biased to a switching position, in which the hydraulic motor is isolated from the hydraulic pressure supplied by the feedback control valve means, to turn off the feedback force.

The control means preferably receives a plurality of vehicle performance parameters signals including a signal indicative of current wheel turn angle and process these signals in accordance with preset algorithms to provide the control signal for the feedback control valve means.

The control unit may use signals indicative of the current wheel turn angle and the speed of the vehicle to provide the control signals for the feedback control valve means.

Alternatively, the control unit may use signals indicative of the transverse acceleration of the vehicle to provide the control signals for the feedback control valve means.

When the system is used on a tractor, the control unit may receive a signal indicating that the tractor is turning on a headland thus decreasing the steering feedback force to allow a quicker turn.

The control unit may receive a signal indicating that the tractor is operating in a field, the switching valve means than operating to isolate the hydraulic motor to turn off the feedback force.

BRIEF DESCRIPTION OF THE PREFERRED EMBODIMENTS

Figure 2:
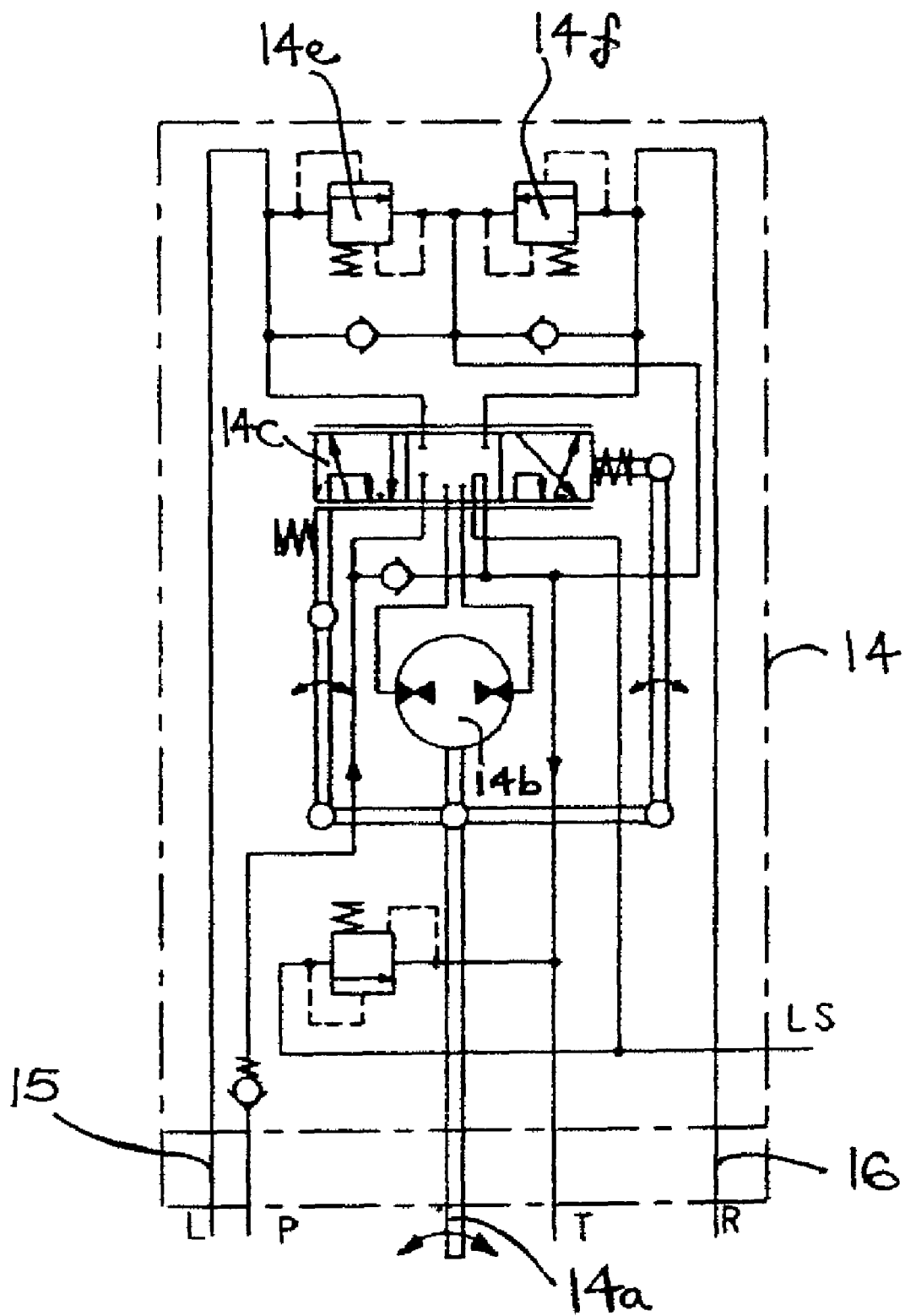

The present invention will now be described, by way of example only, with reference to the accompanying drawings in which:

FIG. 1 shows a schematic diagram of a steering system in accordance with the present invention, and FIG. 2 show diagrammatically a typical power steering unit for use in the system of FIG. 1.

Referring to the drawings, a steering system 10 for use in a tractor or similar utility vehicle has a steering circuit 11 which includes a steering actuator 12 connected to a pair of steerable wheels 13 and a power steering unit 14 which supplies pressurized fluid to the right and left hand turn lines 15 and 16 of the circuit from a source of pressurized fluid P which has a tank return line T.

The steering system also includes a feedback circuit 17 which provides pressurized fluid to a hydraulic motor 18 connected with a steering wheel 40 from the power source P. Pressurized fluid is supplied to motor 18 via left and right turn lines 19 and 20 respectively. Line 19 includes a proportional pressure control valve 21 which is operated by a solenoid 22 which receives an actuating signal from an electronic control unit 23. Similarly line 20 contains a proportional pressure control valve 24 which has a solenoid 25 which is again connected to the electronic control unit 23. The pressure provided to lines 19 and 20 via valves 21 and 24 is arranged to be proportional to the signal supplied to their respective solenoids 22 and 25. Valves 21 and 24 limit the level of pressure which is applied to the motor 18 from the power source. This is achieved by feedback loops 26 and 27 which feedback the pressure in lines 19 and 20 onto the spools of valves 21 and 24 respectively. This feedback pressure opposes the force applied to the spools by the system so that these opposing forces balance when the pressures in lines 19 and 20 reach the level commanded by the system.

Each line 19 and 20 also includes a switching valve 28, 29 respectively. These valves are biased by spring loading 30, 31 respectively to the positions shown in FIG. 1 in which the flow of fluid from the source P to the motor 18 is cut-off and the motor is connected to the relief line 32. Valves 28 and 29 have solenoids 33 and 34 respectively which are again connected with electronic control unit 23. When the solenoids are energized by the control unit 23 the valves 28 and 29 move to their alternative position in which the pressure source P is connected with the motor 18.

The pressure applied to the motor 18 via valves 21 and 24 is used to apply a feedback force to the steering wheel 40 to provide the vehicle driver with appropriate steering feedback. This level of steering feedback is determined by electronic control unit 23 which can operate in accordance with a number of predetermined algorithms.

The steering wheel 40 is connected with the power steering unit 14 by belt 41 or other connecting means so that rotation of the steering wheel 40 results a corresponding rotation of the spindle 14a of the power steering unit 14. As is clear, any other suitable interconnection between the motor 18 and the power steering unit 14 is possible. For example the steering wheel could be attached directly to the spindle 14a and spindle 14a connected with the motor 18 via the belt 41, or the motor 18 and the power steering unit 14 could be axially aligned with each other so that a single spindle (similar to the spindle 14a) could operate both units.

Typically the electronic control unit 23 receives inputs from a plurality of vehicle operating parameters. For example, the angle of turn desired by the vehicle driver is measured by a sensor 42 which measures the turn angle of wheel 40. Unit 23 also receives signals from a further sensor 43 which measures the current turn angle of the associated wheels 13. The pressures in lines 19 and 20 are monitored by pressure sensors 44 and 45 respectively which are again connected with unit 23. Other vehicle operating parameters, such as vehicle speed and vehicle transverse acceleration (measured by accelerometer 47) may be measured and fed into the electronic control unit 23 by lines 46.

Typically the electronic control unit 23 operates in accordance with an algorithm which determines the feedback force applied to motor 18 in response to signals indicative of the current wheel turn angle (from sensor 43) and the speed of the vehicle. Alternatively, the algorithm may vary the feedback force in accordance with the transverse acceleration of the vehicle.

Additionally, the electronic control unit may receive a signal indicative of the fact of the tractor is turning on head land and therefore requires to turn quickly, in order to decrease the steering feedback force to achieve this quicker turning. This head land turning signal could be derived from a signal indicating that the implement hitch of the tractor has been raised to the transport position in association with the application of a high turn angle through the steering wheel 40.

In another variation of the standard algorithm, the electronic control unit 23 may receive a signal indicating the that tractor is operating in the fields (again received, for example, from the position of the tractor hitch) and when in receipt of this field operating signal the electronic control unit may deactivate the solenoids 33 and 34 to disconnect the motor 18 from the power source P so that no steering feedback is provided during field use.

In the event of any failure in the electronic control unit 23, the valves 28 and 29 will return to the FIG. 1 position thus allowing free movement of the steering wheel 40 by the free passage of fluid in line 32.

FIG. 2 shows a typical circuit diagram from a suitable form of power steering unit. The diagram shown is that for the proprietary "Orbitrol unit" sold by the Danfoss company and is merely illustrative of a suitable unit. In the example illustrated, the main spindle 14a of the unit 14 is turned by the steering wheel 40 and hence pressurized fluid from the source P is fed to the left or right lines 15 or 16 as appropriate via a variable restriction 14b and a control valve unit 14c. The steering unit also includes shock protection valves 14e and 14f for the left and right steering lines. Since the details of the particular power steering unit chosen form no part of the present invention it will not be described in any further detail. It will be appreciated that any suitable type of power steering unit can be employed in a steering system in accordance with the present invention provided with a hydraulically generated force acting on the steering wheel.

We claim:

1. A vehicle steering system comprising a steering circuit which includes a steering actuator supplied with pressurized fluid from a power steering unit to turn an associated vehicle wheel to the left or right in response to the movement of a steering wheel, which is connected to the power steering unit by a connecting means, wherein rotation of the steering wheel results in a corresponding rotation of the spindle of the power steering unit, and a separate feedback circuit which includes a steering motor connected with the steering wheel and supplied with pressurized fluid via an electronically controlled feedback control valve means in response to signals received from a control unit to generate a steering feedback force acting on the steering wheel.

2. A system according to claim 1 in which the electrically controlled hydraulic feedback control valve means is a proportional pressure control valve means which regulates the pressure supplied to the motor, and hence the level of steering feedback, depending on the level of feedback signal received from the control unit.

3. A system according to claim 1 in which the pressure from the electrically controlled hydraulic feedback control valve means is passed to the steering motor via a switching valve means which is held in an open position, in which the proportional pressure is supplied to the hydraulic motor, by an electrical signal received from the control unit and is biased to a switching position, in which the hydraulic motor is isolated from the hydraulic pressure supplied by the feedback control valve means, to turn off the feedback force.

4. A system according to claim 3 in which the steering motor is supplied with pressurized fluid via separate left and right turn connections, each connection being supplied via a separate supply line which includes its own proportional pressure control valve means and switching valve means.

5. A system according to claim 1 in which the control unit receives a plurality of vehicle performance parameters signals including a signal indicative of current wheel turn angle and processes these signals in accordance with preset algorithms to provide the control signal for the feedback control valve means.

6. A system according to claim 5 in which the control unit uses signals indicative of the current wheel turn angle and the speed of the vehicle to provide the control signals for the feedback control valve means.

7. A system according to claim 5 in which the control unit uses signals indicative of the transverse acceleration of the vehicle to provide the control signals for the feedback control valve means.

8. A system according to claim 5 for use in a tractor in which when the control unit receives a signal indicating that the tractor is turning on a headland and decreases the steering feedback force to allow a quicker turn.

9. A system according to claims 3 in which the control unit receives a plurality of vehicle performance parameters signals including a signal indicative of current wheel turn angle and processes these signals in accordance with preset algorithms to provide the control signal for the feedback control valve means, the system being provided for use in a tractor in which, when the control unit receives a signal indicating that the tractor is operating in a field, the switching valve means operates to isolate the hydraulic motor to turn off the feedback force.

* * * * *